Aug. 30, 1966 H. M. STEELE, JR 3,270,334

PERFORMANCE RECORD HAVING POSITION CODE AND PRESENT DATA COMPARISON-TYPE INDICATOR

Filed Jan. 13, 1964 2 Sheets-Sheet 1

INVENTOR.

HARRY M. STEELE JR.

BY Lulwider, Patton, Rieber, Lee, and Utecht

Attorneys

INVENTOR.
HARRY M. STEELE JR.
BY Fulwider, Patton, Rieber, Lee, and Utecht
ATTORNEYS United States Patent Office 3,270,334
Patented August 30, 1966

3,270,334
PERFORMANCE RECORD HAVING POSITION CODE AND PRESENT DATA COMPARISON-TYPE INDICATOR

Harry M. Steele, Jr., 3355 Via Golondrina, Tucson, Ariz. 85711

Filed Jan. 13, 1964, Ser. No. 337,490
14 Claims. (Cl. 340—323)

The present invention relates to a device for indicating an interpretation of present data from a record of past performance in which similar data is a factor, and more particularly to a device for indicating a solution, conclusion or selection from the present value of variable data based upon a record of past performance with which similar data was associated.

The present invention is of general application within the expression of relationship above set forth and one embodiment only thereof selected for illustration and description herein is a device for indicating the desirability of betting in horse races based upon track odds and a record of the past performance of similarly rated horses at the particular track and for the particular day and season with respect to which the performance record may have been compiled.

As a result of extensive studies of the results of gambling and games of chance, it has been determined that a recurring pattern appears to exist in the performance of the favorites at the various tracks. This pattern is apparently governed by mass psychology and is sufficiently consistent to provide a favorable basis for selecting bets on the prerated favorites at various track odds, which over a long period should result in a winning percentage to the bettor. This recurring performance pattern varies from track to track and from day to day at a given track, and also from season to season if the track has a multi-season operation.

In the specific embodiment of this invention selected for illustration and description, the records for the best prerated horses are compiled for a given track, season and day of the week, and related to the track odds so as to secure a record of this recurring performance pattern of the betting public. This record is desirably placed on cards or tapes, rolls, or similar recording material of electrically insulating nature through which holes are punched in proper relation to the path of shiftable contacts. The contacts are positioned with respect to the track odds for the individual bettors' favorites, and when indexed with a punched hole or slot will complete an electrical circuit to give an exterior indication of the desirability of placing an appropriate bet on the horses under consideration. For ease of description the record upon which the recurring performance pattern is perforated will be referred to as a "card" which is to include tape, roll and equivalent physical embodiments.

In the specific embodiment illustrated, contacts are provided controlling circuits to indicators for "Win," "Place" and "Show" bets on each of three horses which the individual bettor considers to be the three best horses in the race. It will be understood that the encoded or punched information will conform to the contact arrangement provided for, and that the device may be used with a single horse selection and a single position bet therefor, or may include single position bets for a number of horses, or multiple position bets for a single horse, or any other combination arrangement depending on the available coded record of recurring performance pattern.

It is an object of the present invention to provide an improved device for indicating an interpretation of present data from a record of past performance associated with similar data.

Another object of this invention is the provision of an improved indicating device for a solution, conclusion or selection based upon the present value of variable data and a record of past performance encoded with relation to past values of similar data.

Another object of this invention is the provision of an improved indicating device employing electrical contacts positionable in accordance with the present value of variable data and cooperating with an insulating card perforated in accordance with a performance pattern associated with past values of similar data so that the indexing of a contact with a card perforation will complete an electrical circuit to give an indication based upon the interpretation of the present data value from the past performance pattern.

A further object of this invention is the provision of an improved odds interpreter and bet indicator for horse racing controlled by an encoded record of past race performance.

A still further object of this invention is the provision of an improved odds interpreter and bet indicator for horse racing receiving a replaceable card record of past race performance and settable in accordance with track odds to give a visual indication of a desirable bet.

These and other objects and features of the invention will be readily apparent to those skilled in the art from the following specification and the appended drawing, in which.

Figures 1, 2A:
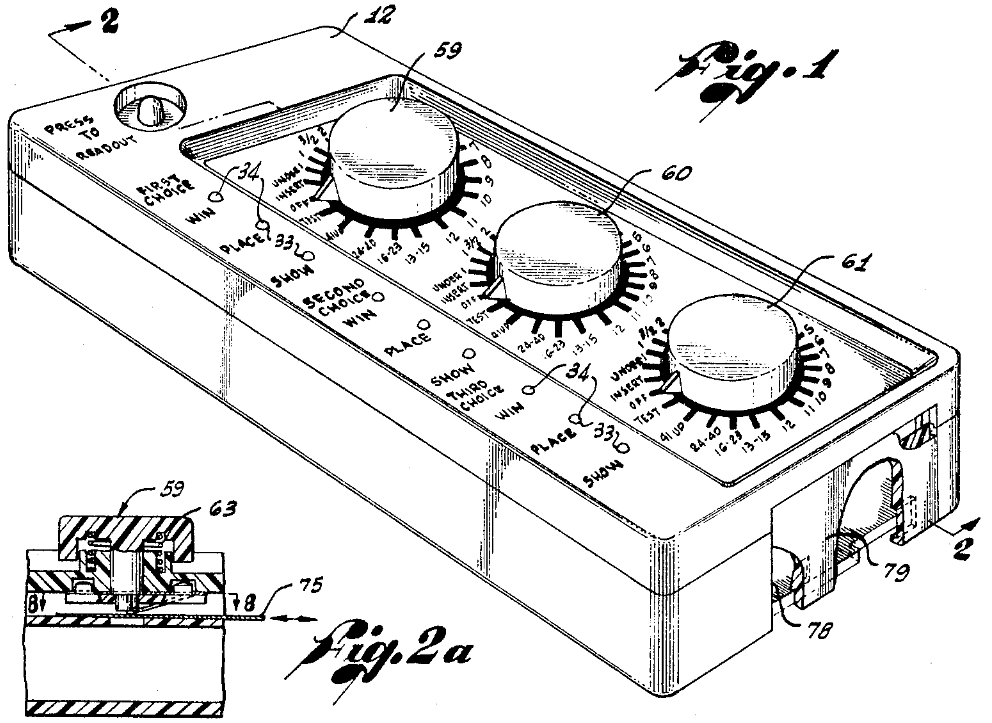
FIGURE 1 is a perspective view of a record-controlled, odds-interpreting bet indicator device according to the present invention.
Figure 2:
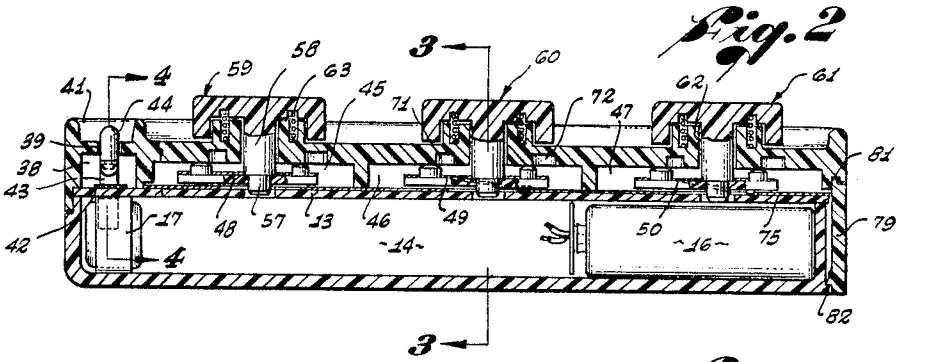
FIGURE 2 is a longitudinal sectional view through the device on the lines 2—2 of FIGURE 1.
Figure 3:
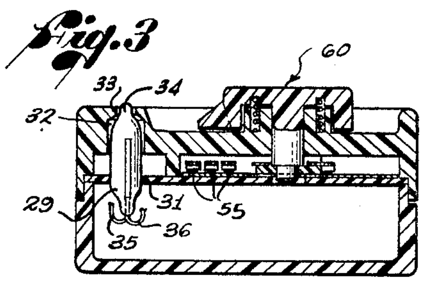
Figure 4:
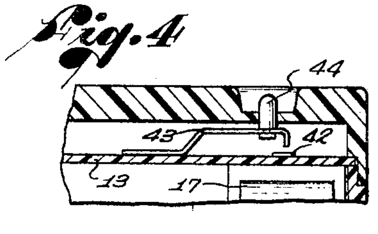
Figure 5:
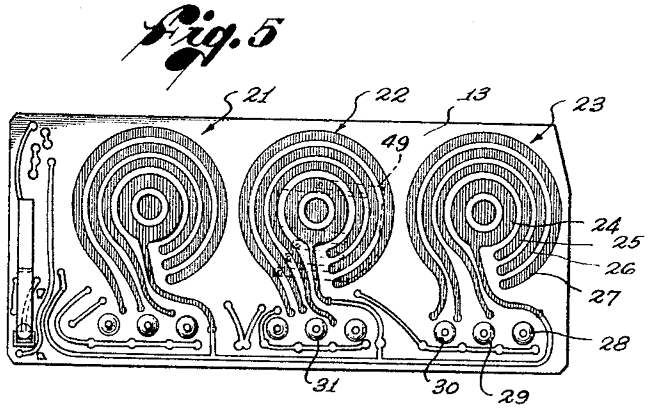
Figure 6:
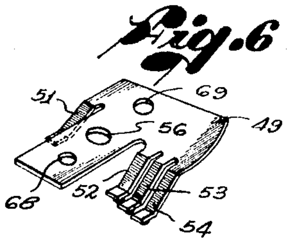
Figure 7:
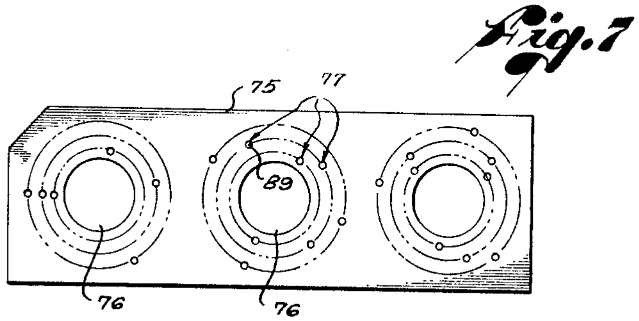
Figures 8, 9:
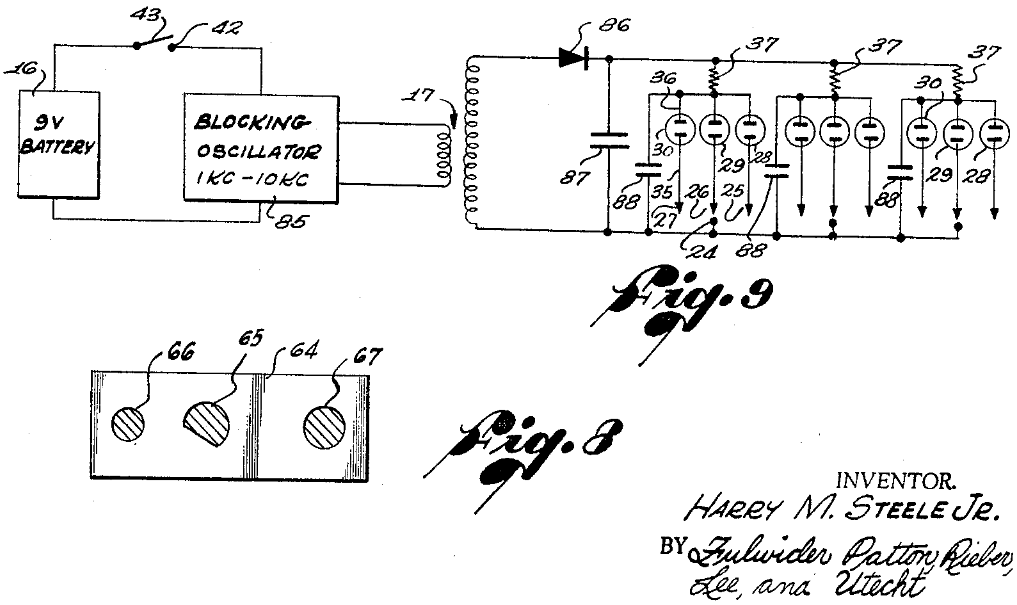

FIGURE 2*a* is a detailed sectional view through one of the contact rotating knobs in the record card replacing position;

FIGURE 3 is a transverse sectional view through the device on the line 3—3 of FIGURE 2;

FIGURE 4 is a detailed sectional view on the line 4—4 of FIGURE 2;

FIGURE 5 is a plan view of the printed circuit board of the device with the position of one set of shiftable contacts shown in phantom;

FIGURE 6 is a perspective view of a set of shiftable contacts for the device of the present invention;

FIGURE 7 is a plan view of a performance pattern record card illustrating the position of the coded punches therethrough with respect to the path of movement of the shiftable contacts;

FIGURE 8 is a detailed sectional view on the line 8—8 of FIGURE 2*a*; and

FIGURE 9 is a wiring diagram for the device.

In the specific embodiment of the present invention illustrated in the drawing, the device includes a box-like enclosure made up of a bottom portion 11 and a top cover 12 relatively permanently attached thereto as by a frictional fit, cementing or other means. Between the bottom 11 and top cover 12 of the enclosure is mounted an insulating printed circuit board 13 beneath which is provided a chamber 14. The chamber 14 accommodates an operating battery 16 and various electrical circuit components mounted on the back of the printed circuit board 13, including a transformer 17 and other components not shown in the drawing except in the wiring diagram of FIGURE 9.

Upon the upper surface of the printed circuit board 13 are mounted three sets, 21, 22 and 23, of arcuate contacts with which shiftable sets of contacts engage through the coding perforations through the record cards. Each set of contacts 21–23 comprises a central circular common contact 24 and three concentric arcuate contacts 25, 26 and 27 connected respectively to the "Show,"

"Place" and "Win" indicator lights 28, 29 and 30. The contacts 24–27 and indicator lights 28–30 are duplicated for each contact set 21–23, in a three-horse indicator such as illustrated in the drawing.

The indicator lights are desirably gas-filled glow tubes such a neon-filled instrument bulbs. They are disposed with a tight fit within openings 31 through the printed circuit board 13 in three groups of three adjacent the bottom long edge thereof, as viewed in FIGURE 5. The back face of the cover 12 is provided with sockets 32 complementarily disposed with respect to the openings 31 and receiving the upper ends of the indicator lights. Small openings 33 communicate the sockets 32 with the exterior of the cover 12 and the tips 34 of the indicator lights are received therein to provide for observance of an illuminated light therethrough. The lights 28–30 of each set are suitably labeled on the top surface of the cover 12, as shown in FIGURE 1, to correspond to the finish bet to be indicated by an illuminated light. The indicator lights each have flexible wire terminals 35 and 36, one of which is connected to one of the arcuate contacts 25–27 and the other of which is connected, through a resistor 37, to the supply, as shown in FIGURE 9.

At its forward narrow edge the under surface of the cover 12 is provided with a cavity 38 which communicates by an opening 39 with a depression 41 in the top surface of the cover. A stationary contact element 42 is mounted on the upper face of the printed circuit board 13 and cooperating therewith is a spring-strip contact 43 having an insulating button 44 mounted adajacent the free end thereof. The button 44 extends through the opening 39 to be engageable by an operator's finger in the depression 41 to move the contact arm 43 into engagement with the stationary contact 42 to effect a circuit-closing operation.

The back face of the cover 12 is provided with three longitudinally aligned circular cavities 45, 46 and 47 in which are disposed the rotatable bridging contact plates 48, 49 and 50, respectively. The contact plate 49 is shown in perspective in FIGURE 6 and in phantom in FIGURE 5 in its relation to the stationary contact set 22. The contact plates 48 and 50 are identical therewith and have similar relationship with the contact sets 21 and 23. The contact plates are formed of resilient material and have resilient contact fingers depending therefrom as follows: a finger 51 in constant engagement with the center annular contact 24 and three fingers 52, 53 and 54 positioned to engage the arcuate contacts 25, 26 and 27, respectively, through openings perforated through the record card. The ends of the contact fingers 51–54 preferably have dimples 55 pressed from their ends to extend through the card perforations into contact with the upper surface of the stationary contacts.

Non-circular mounting holes 56 are provided through the contact plates in which are received non-circular mounting post portions 57 depending from central shafts 58 interiorly of the odds-setting knobs 59, 60 and 61. The shafts 58 extend through cylindrical bearing openings 62 through the cover 12. Springs 63 are received in mating annular slots in the under face of the knobs 59–61 and the upper face of the cover 12 to bias the knobs outwardly. The contact plates 48–50 are secured to the posts 57 by means of strips 64 which, like the knobs 59–61 and the enclosure parts, may be formed of an insulating plastic. Each strip 64 has a non-circular opening 65 conforming to the shape of the post 57 and has a press fit thereon.

Each strip 64 has a pair of short posts 66 and 67 in line with its opening 65, the posts being offset different dimensions from the opening and being of different diameter. The contact plates have complementary openings 68 and 69 therethrough through which the posts 66 and 67 extend. The under surface of the cover 12 has, at opposite sides of each bearing opening 22, a pair of indexing openings 71 and 72 which are of a size to receive the posts 66 and 67 and are similarly offset so as to receive the posts in only one, unique position of the knobs 59–61 corresponding to the "Off" position, shown in FIGURE 2*a*.

A typical performance pattern record card is shown in FIGURE 7 at 75 having openings 76 along its longitudinal axis to be disposed over the annular contacts 24 to expose the same for constant engagement of the contact fingers 51 therewith. The coded performance pattern record is indicated by the perforations 77 through the card which are arranged in positions to overlie the arcuate contacts 25–27 for the projection of contact dimples 55 on the fingers 52–54 therethrough when the contact fingers are so indexed relative to the card. The phantom circles in FIGURE 7 represent the path of the contacts on the fingers 52–54.

The card 75 is positioned within the bet indicating embodiment of this invention as shown in FIGURES 2 and 3 and is insertable and removable through an end opening 78 closed by a flexible plate 79 interlocked by a tongue and groove arrangement 81 with the sides and top of the opening 78 and by a latch 82 at the bottom. The latch 82 may be readily disengaged by moving the flexible plate 79 outwardly at the bottom, whereupon it may be moved downwardly to disengage it and to expose the opening 78 for access to the performance pattern record card 75.

The left hand side of the cover 12 in FIGURE 1 is provided with indicia identifying the indicating lights 28–30 for the finish positions for the first, second and third choice horses. About each of the odds-setting knobs 59–61 are reference marks and indicia to which the knobs are set for the winning odds for the first, second and third choice horses as they appear on the odds board at the track. In addition to the various odds positions for the knobs, there is an "Off" position, shown in FIGURE 2*a*, and a "Test" position at which the operation of the electrical circuit can be verified.

The electrical circuit is shown in FIGURE 9 in which the battery 16 supplies power through switching contacts 42–43 to a blocking oscillator 85 of conventional form and providing an alternating current source. The output of the blocking oscillator is fed through the transformer 17 to a rectifier 86 across which is connected a filter condenser 87 to smooth out the rectified pulses. Across the filtered output are connected relaxation oscillators formed by the resistors 37, capacitors 88 and the indicator lights 28–30 connected in parallel with the capacitors 88 through the contacts 25–27. The contacts 24 are all connected together to one side of the filtered supply and the contacts 25–27 connect the indicator lights 28–30 in parallel to the capacitors 88 and in series with the resistors 37 to the other side of the filtered supply. The contacts 24 are bridged to the appropriate contacts 25–27 through the contact plate 49. The neon glow tube, capacitor and resistor combination form relaxation oscillators which, by the charging and discharging of the capacitors, cause the neon tubes to flash on and off when the circuits therethrough are completed. Therefore the indication of an approved bet selection provided by the device is a flashing of the appropriate indicator light when the read-out switch is closed through contacts 42–43.

The operation of the device as an odds interpreter and bet indicator will be apparent from the above description. The device will preferably be used at the race track where the latest odds can be secured as they vary right up to race time. The horses to be considered are the three top choices of the individual bettor operating this device for the particular race. A performance pattern record card 75 will ordinarily be prepared from the past performance of the best prerated horses for the particular day of the week at the track at which the device is to be used. This card is inserted in the device by removing the end closure plate 79 as previously described. The knobs 59–61 are moved to the "Off" positions, as in FIGURES 1 and 2*a*, whereupon the knobs move outwardly since in this position the posts 66–67 are indexed with the openings 71, 72 in the cover. The contact fingers 51–54 are thereby lifted from the stationary contact arcs so that the record card 75 may be readily inserted into the device as indicated in FIGURE 2*a*.

For each race the winning odds of the three top choices of the individual bettor are set on the knobs 59, 60 and 61. Preferably this setting is made as close to track time as convenient so that the odds will conform as nearly as possible to the final pay-off odds. This rotation of the knobs 59–61 rotates the contact plates 48–50 therewith to shift the contact fingers 51–54 in an arcuate path around the arcuate stationary contacts 24–27. The contact finger 51 is always in contact with the central annular contact 24 and if one of the contacts on the ends of contact fingers 52–54 should project through an opening 77 in the card 75, the circuit to the corresponding indicating light 28–30 will be completed. After the knobs 59, 60, 61 have been set for a particular race, the switch button 44 is depressed to close the switch at contacts 42, 43 to supply battery power to the blocking oscillator 85. If the odds are such that past performance indicates no bet on the race is desirable, no circuits will be completed to the indicating lights and no indication will be given by the closure of the read-out circuit. On the other hand, if the past performance pattern indicates that the odds given for the first, second or third choice horse, or any or all of them, show that a bet is desirable, then an opening 77 will be indexed with the appropriate contact finger for the approved bet. The identifying indicating light will then flash on and off while the read-out switch is closed.

Taking a specific example, let it be assumed that the odds on the individual bettor's second choice are such that when set on knob 60, the contact 55 on the end of the contact finger 53 is positioned to engage the arcuate contact 26 through that perforation 77 indicated at 89 in FIGURE 7. This prepares a circuit through contacts 24 and 26 for the indicating light 29 for the second choice horse. When the readout switch is now closed, the indicating light 29 for the center relaxation oscillator will flash on and off to give an indication at the front of the device by the flashing of the "Place" bet light for the second choice horse. This will indicate to the prospective bettor that his second choice is, on the basis of past performance, a good bet for a "Place" finish position, at the odds shown on the track board. This is not to be considered, of course, as an infallible selection for any particular race, but simply one which, if followed over a period of time, will result in a winning percentage when betting against the other bettors at the track through the pari-mutuel betting system.

While a certain specific embodiment of the invention has been specifically illustrated and described, it is understood that the invention is not limited thereto but is of general application where it is desired to secure an indication of the interpretation of present data from a record of past performance associated with previous values of that data, and that many variations will be readily apparent to those skilled in the art and the invention is to be given its broadest interpretation within the terms of the following claims.

I claim:

1. A device for indicating an interpretation of present data from a record of past performance which comprises: a punch-coded record of a performance pattern associated with variable data; means settable to a plurality of positions corresponding to and indicative of different values of said variable data; a plurality of multiple choice control contacts at one face of said record positioned by said settable means with respect to the coded openings therein; a plurality of contacts on the opposite face of said record individually engageable by a cooperating multiple choice contact when the latter is positioned at and projects through a record opening; a plurality of multiple choice indicators; and circuit means controlled by contact engagement for energizing the appropriate indicator for the choice selection dictated by the positions of the choice control contacts and the record openings.

2. A device for indicating a selection based on interpretation of present data from a record of past performance which comprises: a punch-coded record of a performance pattern associated with variable data; a plurality of multiple choice control contacts disposed in sets on opposite sides of said record and engageable through the coded openings therein to complete control circuits; means for shifting the positions of at least one set of the cooperating control contacts with respect to the coded openings in the record to positions corresponding to and indicative of present values of said variable data; a plurality of selection indicators; and circuit means controlled by engagement of the multiple choice control contacts for energizing the appropriate indicator for the choice selection dictated by the positions of the control contacts and the record openings.

3. A device for indicating a selection based on interpretation of present data from a record of past performance which comprises: a punch-coded record of a performance pattern associated with variable data; a plurality of multiple choice control contacts on opposite sides of said record and engageable to complete control circuits through the coded openings therein; means for shifting the effective positions of the cooperating control contacts with respect to the coded openings in the record to positions corresponding to and indicative of present values of said variable data; a plurality of indicating lights each indicative of a choice selection; and circuit means controlled by engagement of the control contacts for illuminating the associated indicating lights to identify the choice selected.

4. A device for indicating a selection based on interpretation of present data from a record of past performance which comprises: a punch-coded record of a performance pattern associated with variable data; a plurality of multiple choice control contacts on opposite sides of said record and engageable through the coded openings therein to complete control circuits; means for shifting the effective positions of the cooperating control contacts with respect to the coded openings in the record to positions corresponding to and indicative of present values of said variable data; a plurality of indicating lights each indicative of a choice selection; and circuit means controlled by engagement of the control contacts for illuminating the associated indicating lights to identify the choice selected, said circuit means including a relaxation oscillator whereby the selected indicator light is illuminated with a flashing action.

5. A device for indicating a choice selection based on interpretation of present data from a record of past performance which comprises: a record card bearing punch-coded information of a performance pattern; a plurality of elongated, insulated, stationary contact surfaces disposed on one side of said record card in alignment with coded punch paths thereon; a plurality of movable contacts on the opposite side of said card and normally insulated from the stationary contact surfaces by the card; means for moving said movable contacts relative to the card in the paths of the recording punch openings therein; scale means containing values of variable data associated with past performance to which said contact moving means may be set; a plurality of selection indicators; and circuit means controlled by contact engagement through a card opening for energizing the appropriate indicator to identify the choice selection dictated by the relative positions of the movable contacts and the card openings.

6. A device for indicating a choice selection based on interpretation of present data from a record of past performance which comprises: a record card punch-coded in arcuate paths in accordance with a performance pattern; a plurality of insulated, arcuate, concentrically mounted, stationary contacts disposed at one face of said record card in alignment with said arcuate paths; a plurality of rotatably mounted contacts on the opposite face of said card aligned with said stationary contacts but normally insulated therefrom by the card; means for rotating said rotatable contacts over said stationary contacts so as to project through a card punch opening with which they are indexed into engagement with the associated stationary contact; scale means containing values of said data to which said contact rotating means may be set in accordance with present values of said data; a plurality of selection indicators; and circuit means controlled by engagement of a rotary and stationary contact through a card opening for energizing the appropriate indicator for the selection determined thereby.

7. A device for indicating a choice selection based on interpretation of present data from a record of past performance which comprises: a record card punch-coded in arcuate paths in accordance with a performance pattern; a plurality of insulated, arcuate, concentrically mounted, stationary contacts disposed at one face of said record card in alignment with said arcuate paths; a plurality of rotatably mounted contacts on the opposite face of said card in alignment with said stationary contacts and normally insulated therefrom by the card; means for rotating said rotatable contacts along the stationary contacts so as to project through a card punch opening with which they are indexed into engagement with the associated stationary contact; scale means containing values of said data to which said contact rotating means may be set in accordance with present values of said data; a plurality of selection indicating lights; and circuit means individually connecting said contacts with said lights for identifying a selection dictated by the position of a record opening at the set position of a movable contact.

8. The device as claimed in claim 7 in which the indicating lights are neon glow tubes and the circuit means includes a resistor in series and a capacitor in parallel therewith forming a relaxation oscillator by which a selected glow tube operates with a flashing action.

9. The device defined in claim 7 including: a common contact plate on which said movable contacts are mounted; a stationary annular terminal contact; and a brush contact on said contact plate in continuous engagement with said annular terminal contact.

10. A device for indicating a choice selection based on interpretation of present data from a record of past performance which comprises: a record card punch-coded in arcuate paths in accordance with a performance pattern; a plurality of insulated, arcuate, concentrically mounted, stationary contacts disposed at one face of said record card in alignment with said arcuate paths; a plurality of rotatably mounted contacts on the opposite face of said card in alignment with the stationary contacts and normally insulated therefrom by the card; means for rotating said rotatable contacts over the stationary contacts so as to project through a card punch opening with which they are indexed into engagement with the associated stationary contact; scale means containing values of said data to which said contact rotating means may be set in accordance with present values of said data; a plurality of selection indicating lights; circuit means individually connecting said contacts with said lights for identifying a selection dictated by the position of a record opening at the set position of a movable contact; and means providing for axial movement of said rotatable contacts away from the arcuate contacts to facilitate the insertion and withdrawal of a record card between the cooperating contacts.

11. A bet indicator for horse races comprising: a record card having punched openings therein representing past performance of the consensus of handicappers' choices; a plurality of elongated stationary contacts on one side of said card in the paths of the recorded openings therein; a plurality of movable contacts on the other side of the card and normally insulated from the stationary contacts thereby, said movable contacts engaged with the associated stationary contact through a card opening with which they are indexed; means for setting said movable contacts into different positions relative to the card which corresponds to and are dictated by the posted odds for the individual bettors' choices at track time; indicating lights for each of "Win," "Place" and "Show" finish positions; and circuit means interconnecting said contacts and lights for indicating a selected bet in accordance with the positioning of a movable contact at a card opening.

12. The bet indicator as recited in claim 11 in which the stationary contacts are in the form of concentric, relatively insulated arcs, and in which the movable contacts are rotatable therearound to set positions in accordance with posted track odds.

13. The bet indicator defined in claim 11 in which "Win," "Place" and "Show" indicators are provided for each of the individual bettors' top three choices, the indicating lights for each choice being individually controlled by cooperating contacts in which the movable set thereof is shiftable to positions corresponding to and indicative of the posted odds for the particular choice with which it is associated, and in which indication is simultaneously given with respect to the desirability of and the position to be bet for each of these three top choices.

14. The bet indicator defined in claim 11 in which the indicating light circuit means includes a relaxation oscillator for effecting flashing illumination of the selected light.

References Cited by the Examiner

UNITED STATES PATENTS

| | | | |
|---|---|---|---|
| 2,389,394 | 11/1945 | Thomas | 35—48 |
| 2,562,179 | 7/1951 | Dorf | 235—61.12 |
| 2,717,336 | 9/1955 | Craddock. | |
| 3,024,386 | 3/1962 | Chavineau | 340—331 X |
| 3,057,082 | 10/1962 | Wellington | 35—48 X |
| 3,100,352 | 8/1963 | Boissevain | 35—48 X |
| 3,193,817 | 7/1965 | Olewine | 340—321 |

NEIL C. READ, *Primary Examiner.*

R. M. GOLDMAN, *Assistant Examiner.*